Dec. 6, 1966   J. W. FONDAHL   3,289,323
PROJECT NETWORK ANALYZING METHOD AND APPARATUS
Original Filed Nov. 21, 1962   2 Sheets-Sheet 1
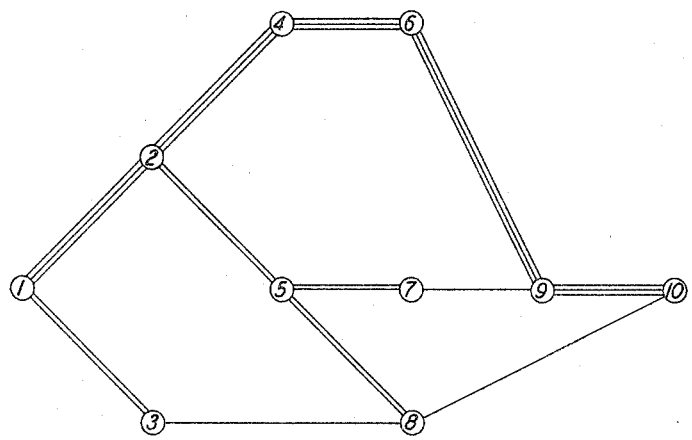
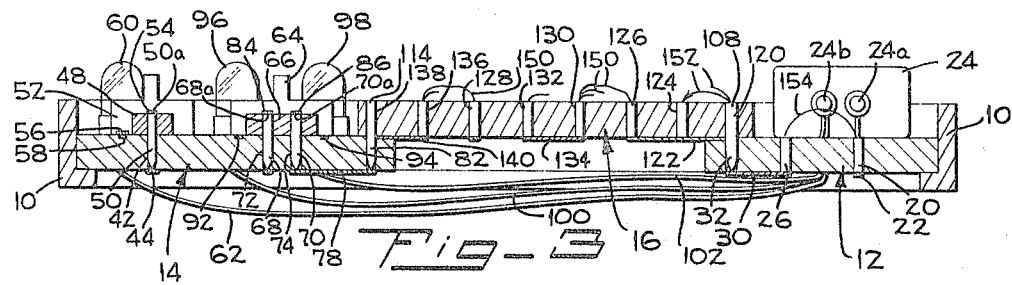
INVENTOR.
JOHN W. FONDAHL
BY Paul B. Fike
PATENT AGENT

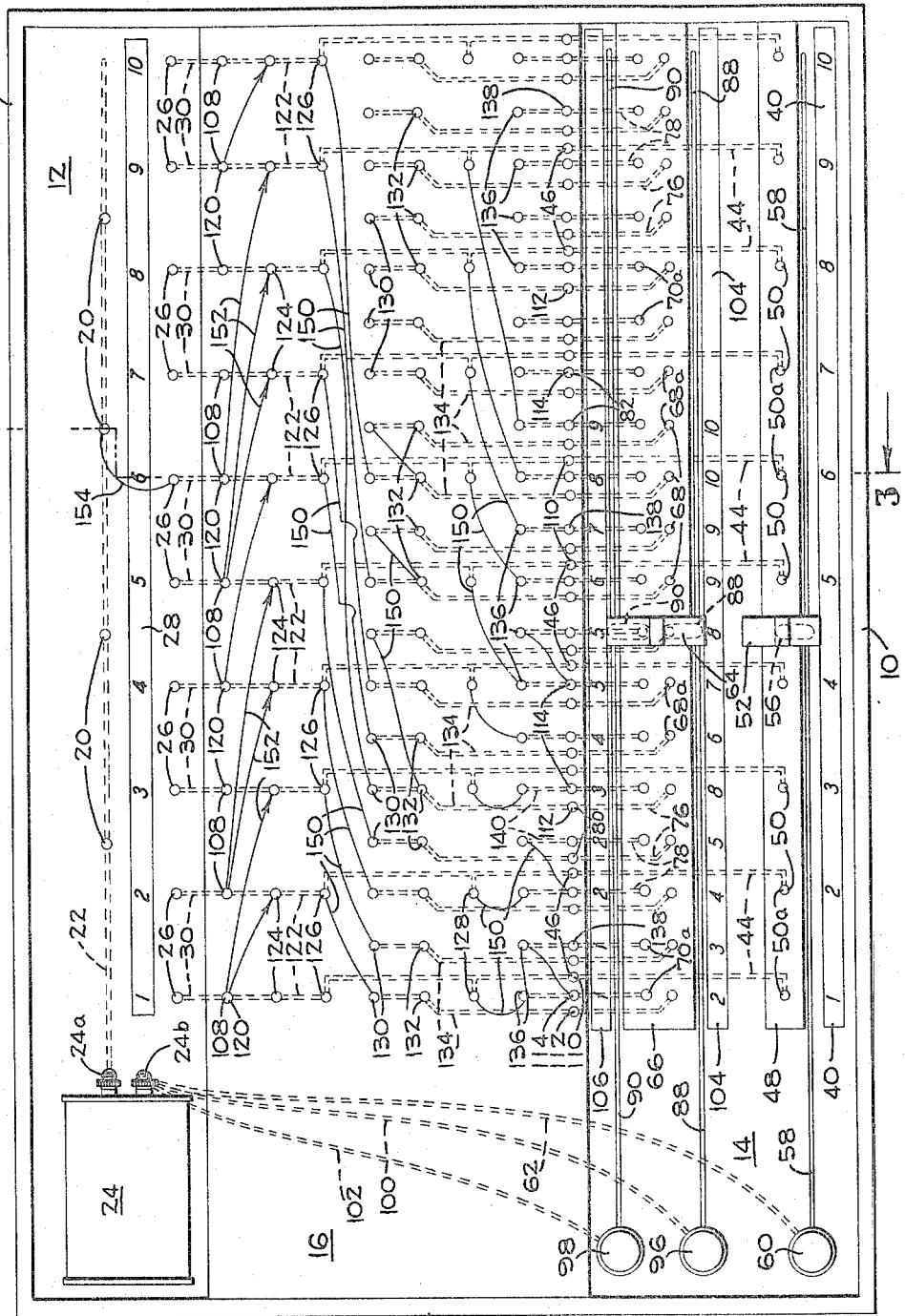

3,289,323
PROJECT NETWORK ANALYZING METHOD AND APPARATUS
John W. Fondahl, 12810 Viscaino Drive, Los Altos Hills, Calif.
Continuation of application Ser. No. 239,229, Nov. 21, 1962. This application May 10, 1965, Ser. No. 458,815
5 Claims. (Cl. 35—24)

The present invention relates generally to project network analyzing techniques and more particularly to a method of and apparatus for indicating the effects of schedule variations in a complex network of interdependent operations. The present application is a continuation of applicant's prior application, Ser. No. 239,229, now abandoned.

Project-type activities, such as construction jobs for example, may be broken down into many individual operations, some of which must be performed in sequence while others may progress concurrently. Proper planning and scheduling of these operations present a complicated problem with both time and cost factors to be taken into consideration. From a scheduling and job control standpoint, it is desirable to know which operations must be held on schedule and what that schedule must be if the overall job is to be completed in a prescribed time. It is equally important to know which operations have scheduling leeway and how much leeway they have without affecting the overall job completion date. From a planning standpoint, it is desirable to determine the most favorable combination of operation scheduling, recognizing that generally each operation may be performed at different rates and correspondingly different costs. If a job completion date has been predetermined, the planning objective may simply be to meet this date with the least expenditure of money. However, in some cases, the planning objective may include determining the optimum completion date as well as the corresponding schedule. This involves balancing such factors as the value of earlier completion to the owner and decreased overhead costs for the contractor against increased direct costs necessary to expedite certain operations.

Systematic analytical methods have been proposed under various names for the solution of these complicated planning and scheduling problems. The most common of these methods are the Critical Path Method (CPM) and the Program Evaluation Research Task (PERT). All of these methods will be referred to as critical path techniques. These critical path techniques require, as a first step, the breakdown of the project into its component operations and the establishment of a project network which is a diagram indicating the sequential relationships of the various individual operations. In one common type of diagram, each operation is represented by an arrow. If one operation must follow another, its arrow tail starts at the arrow head of the predecessor. In another type of diagram, each operation is represented by a circle. If one operation must follow another, a connecting line is drawn between their circles. Later operations are generally plotted to the right of earlier operations. Either of these diagram notations may simply be converted to the other.

The critical path techniques require, as a second step, that time data be furnished for the duration of each operation. These duration times may be expressed in whatever time units are appropriate (e.g., days) and are based on some specific plan for performance. Based on these times and the relationships shown on the network diagram, useful information can be calculated. This includes the earliest possible start and finish time for each operation, the latest permissible start and finish time for each operation that will not delay overall project completion, and measures of scheduling leeway, usually labeled "float" or "slack." Those operations that have no leeway are termed "critical" operations and must be held to schedule if project completion is not to be delayed. There must be at least one unbroken sequential series or chain of critical operations from start to finish of every project, and these chains are known as "critical paths." The time calculations are simple to perform, involving mathematics no more complicated than the addition or substraction of two numbers at a time. Even a large network can be successfully handled by manual computation. However, any change in an operation duration will have a widespread effect on the computed data, and such changes frequently occur. It is principally on this basis that the use of electronic computers are justified for these calculations since complete manual recomputation is a tedious process.

The critical path techniques have a third step that offers tremendous potential value. It requires that additional time data and also cost data be furnished from which may be determined the cost per time unit of varying the scheduling of the various operations. If, as a starting point, all operations are assumed to be performed in the manner that results in least direct cost, a corresponding project time and project total direct cost may be calculated. Then, a systematic procedure can be followed to expedite those operations that will shorten project duration with the least increase in project cost. By these means, the optimum schedule for a given project duration or the optimum project duration and corresponding schedule may be determined. It has frequently been stated, however, that this procedure is so complex that the use of electronic computers is a practical necessity. Computer programs based on linear programming techniques from operations research theory have been written. To date they have not been widely used. An alternative manual approach was originated and published by the inventor in a report entitled "A Non-Computer Approach to the Critical Path Method for the Construction Industry," copyrighted in November 1961, and revised and copyrighted in February 1962. In the application of this approach to the important cost phase, two general steps are required. First, the combination of operations whose durations are to be varied are chosen. The combination must include an operation from each existing critical path, and the total cost per time unit of varying this combination must be the most favorable amount available. Second, the number of time units by which this combination may be varied must be determined. This may be limited by the number of time units that an individual operation can be changed or it may be limited by network interactions that produce new relationships and may result in the introduction of a new critical path or the deletion of an existing one.

The foregoing manual approach has certain advantages over the computer approaches in addition to eliminating dependence upon their use. It permits the cost calculations to be performed without a complete set of cost data, which is often prohibitive and unrealistic to furnish. Moreover, it permits the planner to revise his data at intermediate steps and thereby achieve better results. Unfortunately, although the theory is relatively simple, the calculations are tedious and cumbersome to perform. The most time-consuming step in these calculations is the determination of the network interaction limit mentioned above. This limit is established by determining variations in network "lags." The term "lag" was proposed by the inventor and is the number of time units obtained by substracting the earliest finish time of an operation from the earliest start time of an operation that directly follows it. In a network plotted by circle notation, for example, there is a lag corresponding to every connecting line.

It is the general object of the present invention to provide a network analyzing method which facilitates determining changes in an entire project network resultant from a change in the scheduling time of one or more individual operations.

More particularly, it is a feature of the invention to provide a simple and rapid method for determining which operations in a network are affected by a variation in any given individual operation.

It is yet another feature of the invention to provide a simple method for determining the variation in lags in the project network in response to the change in a particular operation.

It is yet another feature of the invention to provide a simple method for determining the variations in scheduling leeway of the operations in the project network in response to the change in a particular operation.

It is yet another feature of the invention to provide a particularly simple apparatus whereby the network analyzing method can be carried out expeditiously.

A related feature is the provision of a network analyzer in the form of an electric circuit network that can be temporarily wired to conform to any given project network.

Another feature of the invention is the provision of an electric circuit network including a replaceable section that is wired to simulate one particular project network.

Yet a further feature of the invention is the provision of a network analyzer that is of modular construction whereby a plurality of units can be joined as required to provide the requisite indications for any operation network no matter how large it may be.

These as well as other objects and features of the invention will become more apparent from a perusal of the following description of the method and a preferred form of apparatus for carrying out such method, reference being made to the accompanying drawings wherein:

FIG. 1 is a diagram showing a simple project network utilized in the explanation of the present method and apparatus, FIG. 2 is a top plan view of the preferred form of network analyzer arranged to provide indications of project network variations introduced by the variation in one operation of the FIG. 1 network, and FIG. 3 is a cross-sectional view taken along line 3—3 of FIG. 2 to illustrate structural details of the analyzer.

With initial reference to FIG. 1 a project network diagram is illustrated by reference to which the network analyzing method and apparatus of the present invention can be explicated more easily.

The illustrated network is probably simpler than any network to be utilized in practice but is sufficiently complex so that the principles of the present invention can be explained. The diagram includes ten circles, each of which is given a separate numerical designation and represents one operation in the project. Sequentially-related operations are connected by lines. For example, the connecting line between circles numbered 1 and 2 indicates that Operation 2 cannot start until Operation 1 has been finished. The circle representing the earliest operation is plotted on the left of the diagram and other operations are plotted to the right of operations that they follow.

Duration times, in days, have been estimated for each operation. Based on the network relationships and these times, the information shown in the following table, Table 1, could be easily calculated:

TABLE 1

| Operation | Duration (Days) | Earliest Start | Latest Start | Earliest Finish | Latest Finish | Total Float | Free Float |
|---|---|---|---|---|---|---|---|
| 1 | 10 | 0 | 0 | 10 | 10 | 0 | 0 |
| 2 | 15 | 10 | 10 | 25 | 25 | 0 | 0 |
| 3 | 28 | 10 | 24 | 38 | 52 | 14 | 2 |
| 4 | 8 | 25 | 25 | 33 | 33 | 0 | 0 |
| 5 | 15 | 25 | 30 | 40 | 45 | 5 | 0 |
| 6 | 17 | 33 | 33 | 50 | 50 | 0 | 0 |
| 7 | 5 | 40 | 45 | 45 | 50 | 5 | 0 |
| 8 | 10 | 40 | 52 | 50 | 62 | 12 | 12 |
| 9 | 12 | 50 | 50 | 62 | 62 | 0 | 0 |
| 10 | 3 | 62 | 62 | 65 | 65 | 0 | 0 |

To develop the figures shown in Table 1, first the earliest start and finish times of each operation, beginning at the left of the network and working to the right, are calculated. For example, the earliest start time of Operation 1 is zero and, since its duration is 10 days, its earliest finish time is 10 (the end of the tenth day). Since Operation 2 must follow Operation 1, its earliest start time is 10 and, having a duration of 15 days, its earliest finish time is 25. The remaining earliest start and finish times may be calculated in a similar manner. The earliest finish time of the final operation gives the shortest project duration consistent with the estimated operation durations.

The latest start and finish times may be estimated in a similar manner except starting with the final operation and working towards the left on FIG. 1. The latest finish of the final operation is set equal to the earliest finish time already determined, in this case, the end of 65 days. Since the duration of Operation 10 is 3 days, its latest start is 62. Since both Operations 8 and 9 must be completed before Operation 10 can start, their latest finish times are 62. The remaining calculations are similarly performed.

The difference between the earliest and latest finish times (or start times) is given the label "Total Float." It is a measure of scheduling leeway, given a range of time over which the completion of an operation may vary without affecting total project duration. If it is zero, there is no scheduling leeway, and that operation is critical. Table 1 shows that Operations 1, 2, 4, 6, 9, and 10 are critical.

A further measure of the degree of scheduling leeway of operations may be obtained by determining a quantity labeled "Free Float." It is the difference between the earliest finish time of an operation and the earliest of all the earliest start times of operations that directly follow it. For example, the earliest finish time of Operation 3 is 38 and the earliest start time of subsequent Operation 8 is 40. Therefore, Operation 3 has a free float of 2 days. This can be interpreted to mean that the completion of Operation 3 can vary over a 2-day period not only without affecting total project duration but without affecting any other operation. Since its total float is 14 days, its completion can vary over an additional 12 days still without affecting project duration, but it will affect one or more other operations by reducing their floats.

When an operation duration is varied, the data computed for many other operations may also change. One course of action already mentioned if this happens is a complete recomputation of all data. However, the course of action on which the present invention is based involves only a computation of network changes. The basis for determining changes that are produced by a variation in an operation duration is the mentioned quantity defined as "lag." For each pair of sequential operations in the project network, a lag can be computed by subtracting the finish time of the preceding operation, or pre-op, as referred to hereinafter, from the start time of the following, or post-operation, hereinafter frequently referred to as post-op. If earliest start and finish times are used in performing these lag calculations, the resulting lags are labeled "early-lags," while if latest start and finish times are used, the resulting lags are labeled "late-lags." If one is concerned with early lags, the term "early-op" is applied to the particular operations; if late lags, the term "late-op" is similarly applied. For every connecting line in the project network, there is a corresponding value of both early-lag and late-lag. (In an arrow diagram, these lag values exist between each of the arrows terminating in a node and each of the arrows originating at the same node.) Lags must have either zero or positive values.

The following table, Table 2, shows the calculations of the early-lags for the network of FIG. 1. Each connecting line in the network, as defined by its pre-operation and its post-operation, is listed, and the corresponding values of earliest finish times and earliest start times are obtained from Table 1. Then the values of early-lags are the differences between these finish and start times.

TABLE 2

| Pre Op. | Post Op. | E F Pre-op. | E S Post-op. | Early Lag |
|---|---|---|---|---|
| 1 | 2 | 10 | 10 | 0 |
| 1 | 3 | 10 | 10 | 0 |
| 2 | 4 | 25 | 25 | 0 |
| 2 | 5 | 25 | 25 | 0 |
| 3 | 8 | 38 | 40 | 2 |
| 4 | 6 | 33 | 33 | 0 |
| 5 | 7 | 40 | 40 | 0 |
| 5 | 8 | 40 | 40 | 0 |
| 6 | 9 | 50 | 50 | 0 |
| 7 | 9 | 45 | 50 | 5 |
| 8 | 10 | 50 | 62 | 12 |
| 9 | 10 | 62 | 62 | 0 |

On FIG. 1, the connecting lines having positive early-lag values are single but those that have zero early-lag values are doubled. Where there is a continuous path of zero-lag connecting lines from end to end of the project network, this is a critical path and the operations on it are critical operations. These lines are shown as triple-connecting lines on FIG. 1.

To illustrate how network changes are determined when an operation duration is varied, assume that the duration of Operation 6 on FIG. 1 is shortened. Further assume that this shortening results from intentional expediting for the purpose of shortening overall project duration, Operation 6 being the least expensive critical operation to expedite. The variation in duration of one operation in a network will tend to produce changes in other operations that are related to it through zero-lag connecting lines. In this case, shortening Operation 6 not only reduces its earliest finish time but also affects Operations 9 and 10, reducing both their earliest start and finish times. Since a change in operation duration affects some start and finish times but not others, changes in lag values also occur. These lag changes are important because when a positive lag becomes zero or a zero lag becomes positive, the network inter-relationships are changed. Moreover, a new critical path may be introduced or an existing one deleted.

If neither, or both, the finish time of the pre-operation and the start time of the post-operation of any connecting line are affected by the change in duration of the operation varied, its lag is unchanged. These two cases are illustrated, respectively, by Lag 2-4 and Lag 9-10 of the FIG. 1 network. If only one of the times is affected, the lag will change. A careful examination of FIG. 1 and Table 2 will show that only two lags change as a result of the change in Operation 6. Lags 7-9 and 8-10 are both reduced since the earliest finish time of their pre-operation is unaffected but the earliest start time of their post-operation is reduced. Since Lag 7-9 has the least positive value, 5 days, it will be reduced to zero first. Therefore, if Operation 6 were shortened by 5 days, the lag of connecting line 7-9 would become zero. An examination of FIG. 1 shows that this would introduce a second critical path through Operations 2, 5, 7, and 9. Further shortening of Operation 6 alone could not reduce project duration but would merely serve to increase project cost, assuming that it costs money to expedite an operation. To accomplish further reductions in project duration, one operation on each critical path, such as Operations 6 and 7, would have to be shortened concurrently, or an operation common to both paths, such as Operation 2, would have to be shortened.

Changes in one operation are conveyed to other operations through zero-lag connecting lines. Insofar as early start and finish times are concerned, these changes are transmitted to other operations that are plotted to the right of the operation changed on the network diagram of FIG. 1, as explained hereinabove. Late-lags may also be computed from the given late start and late finish times in Table 1. Changes in one operation affect the latest start and finish of other operations to its left on a similar late-lag network diagram that are connected to it by connecting lines whose late-lags are zero. However, in this case, one of two possible procedures must be employed depending on whether the operation varied is critical or non-critical. If, for example, Operation 7, a non-critical operation, was shortened in duration, other operations to its left on the diagram that were connected to it by lines having zero late-lags would tend to be affected. In this case, since latest start and finish times are computed working from right to left on the network diagram, and involve subtraction of operation durations, the latest start and finish times of the affected operations would be increased. To illustrate the difference of the second procedure, suppose that a critical operation, Operation 6, was shortened in duration. Since this is a critical operation it would cause the earliest finish time and, hence, the latest finish time of the final operation, Operation 10 to be reduced. Every other operation in the network lies to the left of Operation 10 and must be connected to it by one or a series of zero late-lag connecting lines. Therefore, the change would tend to reduce the latest start and finish times of every operation. However, since Operation 6 is shortened, it tends to increase the latest start and finish times of operations to its left connected to it by zero late-lag connecting lines. These effects cancel each other and as a consequence the changes produced by the variation in the project duration are not conveyed through the critical operation which has been varied in duration. This result, in turn, is equivalent to temporarily assuming that all late-lags for which Operation 6 is the post-operation are positive lags. Therefore, this second procedure involves assuming that the final operation is changed, and that the late-lags of the connecting lines for which the operation actually varied is the post-operation are positive rather than zero.

To summarize the course of action on which the present invention is based, network lags are computed and changes in these lags are determined whenever an operation duration is varied. As long as these changes do not cause a positive lag to become zero or a zero lag to become positive, the effects of the variation of operation duration on other operations can easily be determined by reference to the chains of zero-lag connecting lines. At the point that the variation does cause a zero lag to become positive or a positive lag to become zero, this change should be made on the project network diagram. Then the effects of further variation can be determined up to the point where another such change is necessary. If a combination of operations is being intentionally varied in duration to produce a desired change in project duration, the addition or deletion of a zero lag often requires that a new combination of operations be selected to accomplish further change in project duration in an optimum manner.

While the procedure on which the present invention is based is simple, it is cumbersome to perform by manual computation. Therefore, the method of the present invention is designed to facilitate the determination of which operations are affected by a change in the duration of one operation and, further, which lags are affected and the manner in which they are affected. Generally, the method of indicating the effect of varying one operation in a project network on the remaining operations entails the steps of initially providing a plurality of conductors, each being individually representative of one operation in the network, thereafter establishing unidirectional electrical connection between conductors of zero-lag, sequentially related operations, then energizing the conductor representative of the operation to be varied, and finally, sensing energization of the remaining conductors.

To indicate the effect of varying one operation in a project network on the lag values of the network, the method additionally includes the steps of providing pairs of conductive test points representative of all sequentially-related pre-operations and post-operations in the network, connecting these test points to the corresponding conductors, and then sensing simultaneously the energization of the pairs of test points.

The method steps can be more readily understood by reference to FIGS. 2 and 3 which illustrate a preferred form of apparatus for carrying out such steps. As illustrated, the network analyzer apparatus includes a generally rectangular frame 10 within whose confines are secured three sections 12, 14, 16 of panelboard composed of insulating material. The uppermost section 12, which shall be termed the input section, is permanently fixed within the frame 10 as is the lowermost section 14, which shall be termed the indicator section. The central panelboard section 16, which shall be termed the operation section, may be removably attached by overlapping the input and indicator sections 12, 14 and making both physical and electrical connections by the insertion of rows of plug-in connectors on the central operation section 16 into rows of receiving jacks on the other two sections 12, 14.

The input panelboard section 12 includes one aligned row of jacks 20 adapted to receive plug-in connectors of a known type, all of the jacks 20 being electrcially joined by a common lead or buss 22 to one terminal 24a of a direct current electrical power source, such as a battery 24, supported on the input section. Preferably, the lead or buss 22 can take the form of a permanent printed circuit conductor. A second row of jacks 26 is formed in the input section 12 adjacent to a label strip 28 which identifies each of these jacks with a particular operation in the network to be analyzed. In the present instance, since the network includes only ten operations numbered from 1 to 10, the label strip 28 is accordingly numbered from 1 to 10, and a corresponding number of jacks, which may be designated as input jacks, are provided. From each of these input jacks 26, a printed circuit conductor 30 extends along the rear face of the panelboard to another jack 32 at the lower edge which will enable electrical connection to a corresponding plug-in connector 108 of the operation section 16, as best illustrated in FIG. 3.

The lower indicator section 14 includes adjacent its lowermost edge an operation label strip 40 numbered 1 to 10 and an adjacent series of jacks 42, each of which is connected by a printed circuit conductor 44 on the rear face of the indicator section to another jack 46 which receives a suitable plug-in connector 110 on the mentioned central operation section 16. A raised track 48 including a plurality of spaced plug-in connectors 50 is mounted above the series of jacks 42 adjacent the label strip 40 so that the plug-in connectors can enter and establish electrical contact with the jacks and the printed circuit conductors 44 associated therewith, the uppermost ends of said plug-in connectors 50 forming a plurality of spaced contacts 50a on the upper surface of the track 48. A U-shaped slide member 52 fits over the described track 48 for sliding movement therealong and contains on its interior a contact 54 arranged to engage a respective one of the contacts 50a at the upper ends of the plug-in connectors 50. From this contact 54 on the slide member 52, conductor 56 extends laterally and then downwardly for continuous sliding contact with a printed conductor 58 on the adjoining surface of the indicator section 14. The extremity of this longitudinally extending printed conductor 58 is joined to one terminal of an indicator bulb 60 whose other terminal is connected by a suitable wire 62 that passes under the indicator section 14 and the operation section 16 for connection to the other terminal 24b of the aforementioned battery 24. The described indicator bulb 60 is referred to hereafter as the "early-op indicator," and the slide member 52 as the "early-op test slide."

Another slide member 64 is similarly mounted for movement parallel to that of the first slide member 52 along another track 66 which, however, includes a double row of plug-in connectors 68, 70 at spaced intervals therealong arranged to enter and make electrical contact with pairs of jacks 72, 74 in the indicator section 14, each of which is connected by a printed circuit conductor 76, 78 on the undersurface of the panelboard to a jack 80, 82 at its upper extremity. The slide member 64 includes pairs of contacts 84, 86 arranged to engage the upper ends 68a 70a of the pairs of plug-in connectors 68, 70 on the track 66, and the slide member contacts 84, 86 are in turn connected to conductors 88, 90 which establish sliding contact with a pair of parallel conductors 92, 94, on the indicator section adjacent the described track 66 so that electrical connection can be established through such parallel conductors to additional indicator bulbs 96, 98 referred to respectively as the "pre-op indicator" and the "post-op indicator," these bulbs being similarly connected to the terminal 24b of the aforementioned battery 24 by wires 100, 102. Preferably, label strips 104, 106 are placed on the indicator section 14 on opposite sides of the slide member 64, which can be designated as the "early-lag test slide," and these strips will designate the respective contacts as the respective pairs of sequentially-related pre-operations and post-operations.

All of the jacks 46, 80, 82 at the upper edge of the indicator section 14 are arranged to receive a row of plug-in connectors 110, 112, 114 at the lower end of the operation section 16 at the same time as the plug-in connectors 108 at the upper edge of the operation section are received in the jacks 32 at the lower edge of the input section 12. Thus, when the operation section 16 is placed in its operative position as illustrated in FIGS. 2 and 3, both physical and electrical connections between this section and the input section and indicator section is established.

In the central, removable, operation section 16, a first row of jacks 120 is formed immediately above the mentioned plug-in connectors 108 that establish electrical and physical connection with the input section 12 of the unit, this first row of jacks 120 being termed the "zero-lag pre-ops." From each zero-lag pre-op jack 120, a printed conductor 122 on the undersurface of the operation section 16 extends directly downwardly to establish connection with a respective zero-lag post-op jack 124, a first network circuit output jack 126, a second network circuit output jack 128 and thence to the plug-in connector 110 at the lower edge of the operation section which is inserted into the indicator connection jack 46 electrically connected to the early-op indicator contact 50a on the lower track 48. Thus, it is to be observed that upon insertion of the operation section 16, the input jack 26 on the input section is automatically connected to the corresponding indicator contact 50a on the indicator section 14. Each column of jacks in the operation section also includes two post-op connection jacks 130, 132 that are electrically connected to one another by a printed circuit conductor 134 which also extends along the undersurface of the operation section for electrical connection to the plug-in connector 112 at its lower edge which establishes electrical and physical connection with the indicator section jacks 80 and ultimately to the post-op indicator contact 68a. In turn, two additional jacks 16, 18, designated as the pre-op connection jacks, are electrically connected by a printed conductor 140 on the undersurface of the operation section 16 and the lowermost jack 138 mounts thereunder one of the aforementioned plug-in connectors 114 that enters the jack 82 in the indicator section 14 which is, in turn, electrically connected to the pre-op contact 70a on the described early-lag test track 66 of the indicator section.

Preferably, as illustrated, there are provided twice as many jacks in the rows of pre-op and post-op connection jacks 136, 138, 130, 132 as there are operation input jacks 26. This is based on the requirement of a pre-op and post-op jack for every lag value in the project network and the fact that there are always more lags than operations, but almost never twice as many. Therefore, in general, there is excess capacity provided for pre-op and post-op connections. Further, the extra row of both pre-op and post-op connection jacks 138, 132 is provided to facilitate the installation of temporary connectors, as will be described hereinafter, where the same operation is the pre-operation or post-operation of multiple lag values. For example, if an operation is the pre-operation for two lags, a temporary connecton may be made between the proper network circuit output jack 126 or 128 and the pre-op jack 136 for the first lag in its first row. Then, the temporary connection to the pre-op jack 136 for the second lag may be made from the second row jack 138 of the first lag rather than from the circuit output jack 126 or 128 which already contains a connector. This avoids stacking connectors at the operation points or having to provide multiple lead connectors.

The circuit connections as thus far described comprise the permanent wiring of the apparatus and, in particular, the provision of the jacks and the associated printed conductors which connect the input jacks of the input section 12 through a plurality of jacks to the early-op indicator contacts on the indicator section 14 corresponds to the first step in the method of the present invention or, in other words, the provision of a plurality of conductors, each being individually representative of one operation in a project network.

In order to simulate the particular network to be analyzed, such as the project network illustrated in FIG. 1, temporary connectors can be plugged into appropriate jacks on the operation section 16. Such temporary connectors can take the form of a short section of wire with suitable plugs adapted for insertion into the operation section jacks. Since such jacks and plug-in connectors are of conventional nature, the temporary connections corresponding to the project network of FIG. 1 are indicated in FIGS. 2 and 3 only diagrammatically. As mentioned, the temporary plug-in connections made to simulate the project network of FIG. 1 are all made in the central removable operation section 16 and since this entire section is removably connected to the indicator section 14 and the input section 12, it will be obvious that the operation section 16 can be removed as a unit with the temporary wiring in place and replaced at some later time when analysis of this particular project network is again desired. While such operation section 16 is removed, another operation section temporarily wired to simulate a different project network can be inserted and the assembled unit used for analysis of such alternative network. In practice, such substitution or replacement of one simulated network for another enhances the utilitarian scope of the illustrated apparatus.

In order to insert temporary connectors specifically to simulate the network illustrated in FIG. 1, plug-in connectors 150 are inserted between the appropriate network circuit output jacks 126, 128 and the corresponding post-op connection jacks 130, 132 and are similarly inserted between the network circuit output jacks 126, 128 and corresponding pre-op connection jacks 136, 138, as shown in FIG. 2.

Thereafter, plug-in connectors 152 having a unidirectional current flow characteristic are inserted between the zero-lag pre-op jacks 120 and the corresponding zero-lag post-op jacks 124 which correspond to sequentially-related operations having zero-lag therebetween in the project network diagram of FIG. 1 and, more particularly, as tabulated in Table 2. Such unidirectional connectors 152 are only indicated diagrammatically with arrowheads in FIG. 2 indicating the direction of current flow, since many unidirectional connectors are well known in the electrical art. For example, a unidirectional connector for the described purpose can include two plug-in connectors with a connecting wire therebetween and a simple diode inserted somewhere in the series circuit so established. By way of illustration, it will be noted from Table 2 that zero lag exists between Operation 1 and Operation 2 and also exists between Operation 1 and Operation 3. Consequently, zero-lag connectors 152 are inserted between the number 1 zero-lag pre-op jack and the number 2 zero-lag post-op jack and also between the number 1 zero-lag pre-op jack and the number 3 zero-lag post-op jack. Such insertion of unidirectional connectors 152 continues until unidirectional current flow is enabled between each pre-op jack 120 and every post-op jack 124 between which a zero-lag relationship exists. Such placement of the unidirectional connectors 152 completes the second step of the described method.

The third step of the method contemplates the energization of that conductor which represents the particular operation in the network which is to be varied. If it is assumed, for example, that Operation 6 is to be shortened, as briefly discussed hereinabove, an input plug-in connector 154 is inserted as shown in FIG. 2 between one of the power supply jacks 20 and the input jack 26 corresponding to Operation 6. Such insertion energizes not only the conductor corresponding to Operation 6 but also the conductors corresponding to operations that follow Operation 6 and have a chain of zero-lag relationships therewith. Careful inspection of the apparatus as illustrated in FIG. 2 will indicate that the conductors corresponding to Operations 9 and 10 are energized simultaneously with the energization of the conductor corresponding to Operation 6. Such energization is more simply ascertained by movement of the early-op indicator slide member 52 along its track 48. As the contacts 50a associated with each of Operations 6, 9, and 10 are engaged, a circuit is completed through the early-op indicator bulb 60 so that the bulb lights and indicates that the variation in Operation 6 effects a change not only in Operation 6 but in Operations 9 and 10 as well. Thus, in accordance with an additional step of the method, the affected operations are readily sensed by the simple movement of the slide member 52.

The changes in the lag relationships between the respective pairs of sequentially-related operations is indicated, in accordance with an additional step of the method, by the simultaneous sensing of the energization of the pairs of pre-op and post-op indicator contacts 68a, 70a through movement of the other slide member 64 along its track. Before the indication of the change in lag values, the temporary connector 150 between the Operation 6 circuit output jack 126 and the corresponding post-operation connection jack 130 must be removed in order to prevent an erroneous indication. This must be done because the post-operation jack 130 involves the earliest start time of the particular operation and even though the network circuit output jack 126 is energized, the earliest start time of Operation 6 is not affected by the assumed change in its duration. Now if, for example, the slide member 64 is positioned between the pre-op 2 and post-op 4 contacts 68a, 70a, neither of which are energized, neither of the indicator bulbs 96, 98 will be energized and an immediate indication is given that no change in the lag relationship between these operations exists. If the slide member 64 is moved to the position between the pre-op 9 and post-op 10 contacts, both of which are energized, both indicator bulbs 96, 98 will light to thus indicate an equivalent change in both operations so that, as a consequence, no change in the lag relationship therebetween is effected. In short, if neither of the indicator bulbs 96, 98 are energized or both are energized, no change in the lag relationship is indicated.

If the slide member 64 is moved along its full length, it will be found that in all positions except two there is an indication of no change in the lag relationships. The two exceptions are for lags 7–9 and 8–10, where only the post-op indicator bulb 98 will light since Operations 7 and 8 are unaffected but Operations 9 and 10 are affected by the change in Operation 6. Because Operation 6 was assumed to be shortened, a reduction in the start time of the post-operation without a corresponding reduction in the finish time of the pre-operation is indicated for these two lags. This is equivalent to a reduction in the lag values. A check with the previously calculated lag values would indicate that lag 7–9 can only be reduced by 5 days before it becomes zero while lag 8–10 could be reduced 12 days. Therefore lag 7–9 is controlling and when, and if, Operation 6 is shortened by 5 days, an additional unidirectional connector 152 must be inserted in the operation section 16 between the zero-lag pre-op jack 120 of Operation 7 and the zero-lag post-op jack 124 of Operation 9. This updates the network relationships as simulated on the operation section 16 of the apparatus for proper indication of the effects of further changes in operation durations.

Moreover, a lag change involving a zero-lag value requires a change in the zero-lag representations on the network diagram and may result in addition or deletion of critical paths. In this case, as previously discussed, the network diagram indicates an additional critical path. If it were desired to reduce project duration more than 5 days, a different course of action than simply expediting Operation 6 alone would have to be followed. If this new course of action did not involve Operation 6, the temporary connector between the Operation 6 output jack 116 and the corresponding post-operation connection jack 136, removed earlier, must now be replaced.

The ability to indicate changes in early-lags produced by changes in individual operation durations makes this invention highly useful for facilitating the computation of scheduling variations at optimum cost. This can be accomplished by the procedure just described.

However, the utility of the invention can be increased by additional steps. When an operation is changed, it is desirable to determine new values for the earliest and latest start and finish times and the total and free floats. As an alternative to a complete recalculation of these values, this invention can indicate changes in these values, and therefore provides a basis for easily revising those quantities that are affected. When an operation is changed, its earliest finish time is changed accordingly. The early-op indicator will show the other operations that are affected by the change, and both their earliest start and earliest finish times can be changed by the same amount, subject to the updating of the circuit by the addition or removal of zero-lag connectors when lag changes require it. Moreover, the ability to revise early-lags also permits revision of free float values, since the free float of an operation is equal to the least of the lag values for which that operation serves as the pre-operation. Therefore, additional steps are necessary only to determine changes in latest start and finish times and total float.

This may be accomplished by working with late-lags rather than early-lags. A late-lag, as previously mentioned, is the difference between the latest start of the post-operation and the latest finish of the pre-operation. They may be easily computed in the same manner as early-lags were computed in Table 2. When the temporary connectors are installed on the operation section 16 of the apparatus, the unidirectional connectors 152 are installed on the basis of the zero late-lags rather than the zero early-lags. Moreover, these unidirectional connectors 152 are reversed to permit current flow from right to left rather than from left to right. The remaining temporary connectors 150 between network circuit output jacks 126, 128 and corresponding pre-op and post-op connection jacks 136, 138, 130, 132 are located the same as when working with early-lags.

If a non-critical operation, such as Operation 7, is changed, an input connector 154 is inserted between a power supply jack 20 and the Operation 7 input jack 26. Then, since the latest finish time of the operation being varied does not change, the connector between its output jack 126, 128 and the corresponding pre-op jack 136, 138 is temporarily removed. Now, the slide member 64 may be used to determine lag variations produced. This, in turn, indicates at what intervals of change zero-lag connectors must be added or removed from the operation section 16. Subject to these connector changes, movement of the slide member 64 now indicates those operations whose latest start and finish time will be affected.

As previously explained, the procedure to be followed when a critical operation is changed is different. If a critical operation, such as Operation 6, is changed, an input connector 154 is inserted between a power supply jack 20 and the input jack 26 of the final operation in the project network, Operation 10, in this case. Then, the zero-lag connectors 152 for which Operation 6 is the post-operation are temporarily removed. Also, since in this case, the latest finish time of the operation being changed is affected but its latest start time is not affected, the connector 150 between the circuit output jack 126, 128 of the operation being changed and the corresponding post-op connection jack 130, 132 is temporarily removed. The remainder of the procedure is the same as in the case of the non-critical operation.

This procedure involving the use of late-lags makes it possible to determine which latest start and finish times are affected by a given change in an operation duration. Moreover, it is possible also to determine changes in the only remaining quantity, total float. Since total float is the difference between earliest and latest finish (or start) times of an operation, to the extent that one of these has changed more than the other, the total float of the operation will be changed accordingly.

The determination of the changes in quantities dependent on late-lags is possible but inconvenient on a single unit of the apparatus described. It would require changing the position of all of the zero-lag connectors 152 each time a change in operation duration occurred in order to first determine changes dependent on early-lag relationships and then to determine changes dependent on late-lag relationships. Therefore, where it is desired to determine changes in total float and latest start and finish times resulting from changes in operation durations, it is recommended that two units generally similar to that of FIG. 2, but wired respectively on the basis of early-lags and late lags, be placed adjacent to one another. It is possible, then, to gang together the early-op and late-op test slides. Then, as this ganged slide is moved along its operation output contacts, the two corresponding indicators would give a direct indication of total float changes. If neither indicator for a given operation was energized, or if both were energized, total float for that operation would be unchanged, since both the earliest finish and latest finish time would be affected in the same manner. If only one indicator were energized, total float would change. The direction of change could easily be determined by noting which indicator was the one energized and whether the operation whose duration change was causing the variation was being lengthened or shortened.

To summarize the ability of this invention to indicate changes in the various time quantities generally useful in critical path applications, the following statements may be made:

(1) Changes in network lags are the key to determining network interaction limits in planning scheduling variations. These limits control how much an operation may be varied in duration before network changes take place that may require a different course of action for further change in project duration. A single unit of the apparatus described, with temporary zero-lag connectors based on early-lag relationships, provides the information required.

(2) When an operation is varied, six quantities for that operation and other operations may also change. These are the earliest and latest start and finish times, the total float, and the free float. A single unit of the apparatus of this invention, with zero lag-connectors installed on the basis of early lag relationships, permits simple determination of changes in three of the six quantities named above: earliest start time, earliest finish time, and free float.

(3) A second unit of the apparatus of this invention, with zero-lag connectors installed on the basis of late-lag relationships and with its late-op test slide gang-connected to the early-op test slide of the first unit, will permit rapid determination of changes in total float. Changes in the remaining two quantities, latest start time and latest finish time, may also be easily determined by this second unit, if desired.

The described apparatus is capable of handling but 10 operations although there is obviously no limit to the size of a particular apparatus. However, it may be mentioned that each unit can be considered as a module, and a plurality of units can be arranged in side-by-side physical relationship to enable the method to be carried out for any particular project network whatever its size and complexity may be.

Various other modifications and/or alterations can obviously be made in the described method and the preferred form of apparatus illustrated herein without departing from the spirit of the present invention. Consequently, the method and apparatus, as described, are to be considered only as exemplary and not in a limiting sense and the actual scope of the invention is to be indicated only by reference to the appended claims.

What is claimed is:

1. A project network analyzer which comprises a panelboard composed of insulating material, a plurality of electrical jacks in said panelboard, a plurality of conductors on said panelboard, each conductor connecting a group of said jacks and representative of one operation in the project network, a unidirectional connector including plugs at its ends arranged for insertion into jacks associated with conductors representative of zero-lag, sequentially-related operations, a power jack forming one terminal of a two-terminal source of direct current power, means including a power connector having plugs at its opposite ends for connecting said power jack to a predetermined one of said conductor jacks, and means for selectively connecting each of said conductors to the other terminal of said power source.

2. A project network analyzer according to claim 1 wherein said panelboard is composed of separable sections and said jack pairs connected by said unidirectional connectors are located on one of said separable sections.

3. A project network analyzer which comprises three panelboard sections composed of insulating material and including an input section, an indicator section, and an operation section, said input section including at least one electrical jack adapted for connection to one terminal of a source of direct current power, and a series of input jacks corresponding to separate project operations; said indicator section including a series of operation contacts corresponding to the network operations and a series of jacks connected thereto, an indicator adapted for connection to the other terminal of said power source, and a slide member having a contact connected to said indicator and adapted for selective connection to respective operation contacts; said operation section including a series of plug pairs arranged for simultaneous insertion into a respective one of said input jacks in said input section and a respective one of said jacks in said indicator section, a conductor connecting each pair of plugs, and means including unidirectionnal connectors for electrically connecting said plug-connecting conductors.

4. A project network analyzer which comprises two similar indicating units, each unit including a plurality of conductor pairs, a source of direct current power having two terminals, means for connecting one of said terminals to a predetermined conductor, one of said units including an early-lag unidirectional connector electrically connecting each pair of conductors representative of zero early-lag, sequentially related pre-operations and post-operations so that current flow from the pre-operation conductor to the post-operation conductor is enabled, the other unit including a late-lag unidirectional connector electrically connecting each pair of conductors representative of zero late-lag, sequentially-related operations so that current flow from the post-operation conductor to the pre-operation conductor is enabled, and means for simultaneously selectively connecting the conductors on both units representative of the same operation to the other terminals of said power source.

5. The method of indicating the effect of varying one operation in an operation network on the remaining operations which comprises the steps of providing a plurality of conductors, each individually representative of one operation in the network, establishing unidirectional electrical connection between conductors representative of zero-lag, sequentially-related operations, additionally providing pairs of conductive contacts representative of all sequentially-related pre-operations and post-operations in the network, connecting these contacts to the corresponding conductors, energizing the conductor representative of the operation to be varied, and then sensing simultaneously energization of selected contacts.

References Cited by the Examiner
UNITED STATES PATENTS

| | | | |
|---|---|---|---|
| 2,893,137 | 7/1959 | Alling et al. | 35—19.1 |
| 2,983,892 | 5/1961 | Williams et al. | 35—19.1 X |
| 3,124,885 | 3/1964 | Mendell | 35—24.2 |

EUGENE R. CAPOZIO, *Primary Examiner.*

W. GRIEB, *Assistant Examiner.*